Figure 1:
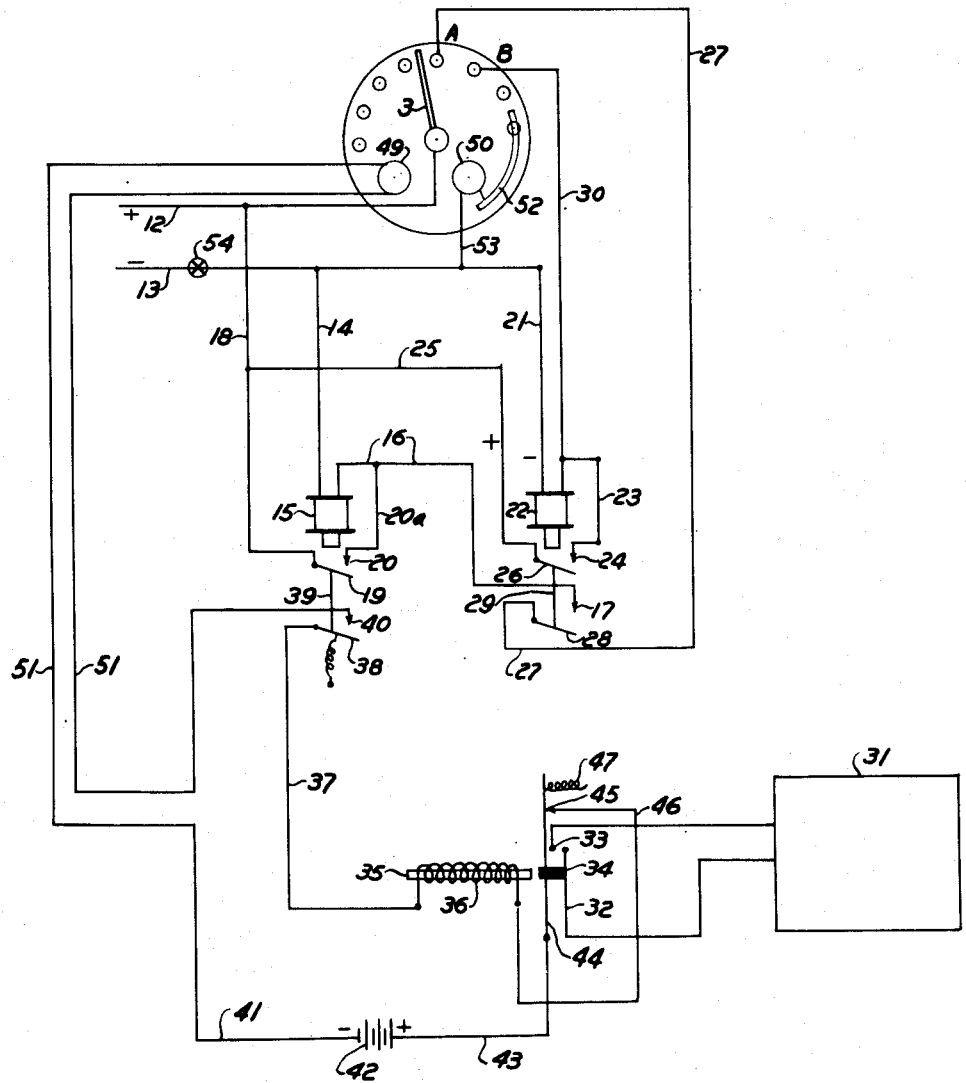

Nov. 4, 1947.　　　C. L. SHEETS　　　2,430,305
SPEED SIGNALLING DEVICE
Filed July 24, 1946　　　3 Sheets-Sheet 1

INVENTOR
CLARKE L. SHEETS.
BY Samuel Weisman
ATTORNEY.

Nov. 4, 1947.   C. L. SHEETS   2,430,305
SPEED SIGNALLING DEVICE
Filed July 24, 1946   3 Sheets-Sheet 2

INVENTOR.
CLARKE L. SHEETS
BY
ATTORNEY.

Nov. 4, 1947.  C. L. SHEETS  2,430,305
SPEED SIGNALLING DEVICE
Filed July 24, 1946   3 Sheets-Sheet 3

INVENTOR.
CLARKE L. SHEETS
BY
ATTORNEY.

Patented Nov. 4, 1947

2,430,305

UNITED STATES PATENT OFFICE 2,430,305

SPEED SIGNALLING DEVICE

Clarke L. Sheets, Detroit, Mich.

Application July 24, 1946, Serial No. 685,938

6 Claims. (Cl. 177—311.5)

1

The present invention pertains to a novel speed signalling device and is intended particularly for locomotives although not necessarily limited thereto.

Rear end collisions frequently occur because the forward train has slowed down considerably below its scheduled speed and the engineer of the rear train has not been adequately warned. The principal object of this invention is to provide a signal that will automatically operate when the locomotive has decelerated to a pre-determined unsafe speed. In this connection the signalling apparatus is so constructed that it will not operate while the vehicle is below and passes through the critical speed on acceleration but only as the vehicle decelerates from a normal or safe speed through and below the pre-determined unsafe speed.

In the accomplishment of this object, there is provided on the vehicle a speed-controlled switch which may be in the form of a conventionally driven speedometer equipped with switch contacts adapted to be plugged in at selected speed graduations. The pointer of the speedometer carries the movable switch member that selectively engages the switch contacts.

One of the contacts is inserted at the graduation for the predetermined critical speed, and another contact at a higher speed graduation. The signal may be generated by a broadcasting set in an independent circuit which is preferably of a pulsating character. This circuit has a normally open switch adapted to be closed by an electrical device such as an electro-magnet, in the circuit of the lower speed contact. The latter circuit, however, also contains a normally open switch that is closed by an electrical device, such as an electro-magnet, in the circuit of the higher speed contact. Consequently, the higher speed contact must be engaged by the movable switch member before the circuit of the lower speed contact can be closed to operate the signal control switch. In other words, the signal circuit is closed only on deceleration from a given speed to the predetermined unsafe speed. Holding circuits for the aforementioned electrical devices are provided. The invention also contemplates a third contact on the speedometer for de-energizing the holding circuits and hence the signal control circuit when the vehicle accelerates again into a safe speed.

The broadcasting set preferably has a range of about four miles which is considered adequate for railroad operation and permits the rear train ample distance in which to stop gradually on receiving the danger signal. Although the character of

2 the signal may be selected and determined as desired, it is preferred to broadcast a shrill sound with a pulsation or interruption at a rate that will produce an unpleasant sensation on a listener within its range and will thereby attract his attention quite forcibly.

Figure 2:
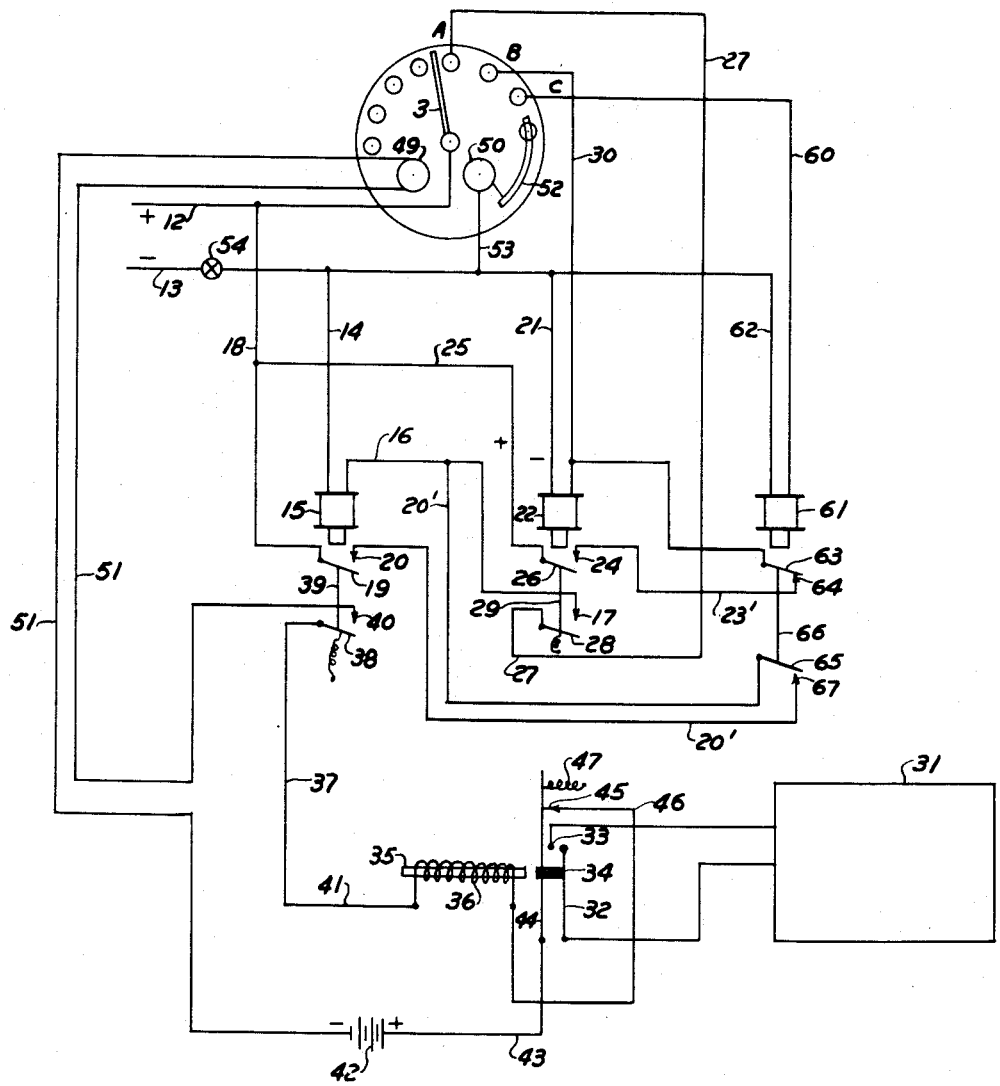
Figure 3:
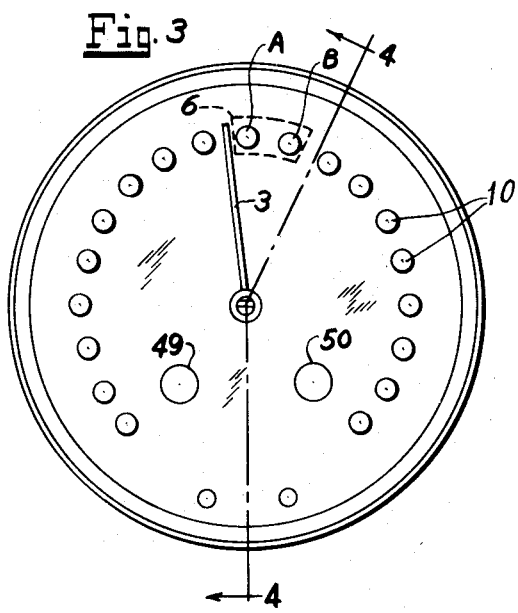
Figure 4:
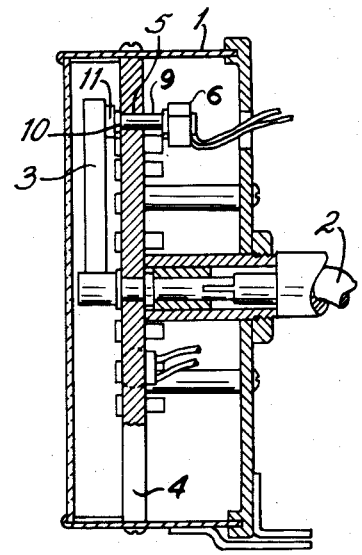
Figure 5:
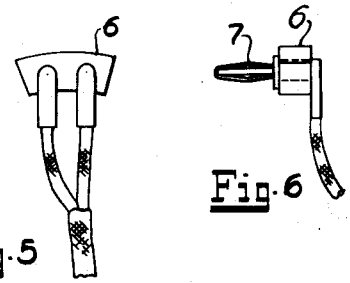
Figures 6, 8:
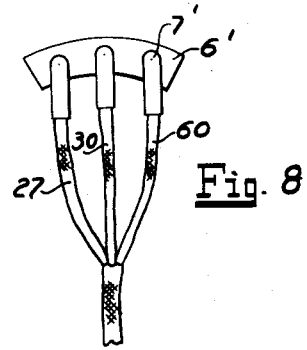
Figure 9:
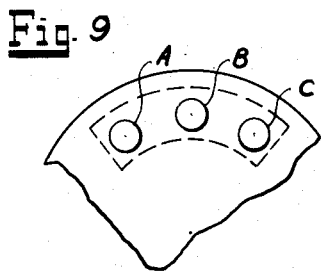
Figure 7:
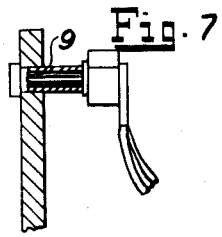

The invention is fully disclosed by way of example in the following description and in the accompanying drawings in which:

Figure 1 is a wiring diagram of the apparatus;
Figure 2 is a wiring diagram of a modification;
Figure 3 is an elevation of the speedometer;
Figure 4 is a section on the line 4—4 of Figure 3;
Figure 5 is an elevation of the plug-in block associated with Figures 1, 3 and 4;
Figure 6 is an end view thereof;
Figure 7 is a detail of Figure 4 in the same plane;
Figure 8 is an elevation of the plug-in block associated with Figure 2, and
Figure 9 is an elevation of the speedometer of Figure 2.

Reference to these views will now be made by use of like characters which are employed to designate corresponding parts throughout.

The vehicle, in this case a locomotive, is equipped with a speedometer 1 of conventional design except in the particulars hereinafter described. The speedometer is actuated in any suitable manner, for example, by a disk driven by a wheel tire or tread or by a belt and pulley or gears operating off an axle, to drive the usual flexible shaft 2 and pointer 3 carried thereby in front of the dial 4. The speed marks or graduations are in the form of apertures 5 through the dial 4, especially in the critical speed range, although they may be of this nature throughout for variability.

Behind the dial 4 is a loose insulating block 6 formed with resilient plugs 7 respectively in line with two apertures 5. A hollow pin or sleeve 9 inserted through each aperture 5, and the plug 7 are receivable selectively in two such sleeves. Each sleeve 9 has a head 10 on the face of the dial 4 and engageable by a contact 11 carried by the pointer 3.

One side 12 of a circuit is permanently connected to the pointer 3 as shown in Figure 1. The other side 13 of the circuit is branched at 14 to one terminal of an electromagnet 15. The other terminal of the magnet is joined by a conductor 16 to a switch point 17 for a purpose that will presently be described. A line 18 is carried from the line 12 across the face of the magnet 15 and connected into the conductor 16. The line 18 is however normally opened by a switch blade 19 opposite the face of the magnet and engageable with a switch point 20 in the line only when the magnet is energized. The switch point 20 joins the conductor 16 through a shunt 20a.

The line 13 is branched again at 21 to a terminal of another electromagnet 22. From the other terminal of the magnet extends a shunt 23 terminating in a switch point 24 near the face of the magnet. A conductor 25 extends from the line 18 to a switch blade 26 lying opposite the face of the magnet 22 and adapted to engage the contact 24 when the switch is energized.

The plugs 7 are inserted at two of the apertures 5, one of them being positioned at the critical speed graduation where a signal is to be given, and the other being inserted at a higher speed graduation, preferably the next higher one. These are designated respectively as A and B.

The plug 7 at graduation A is joined by a conductor 27 to a switch blade 28 adapted to engage the contact 17 but normally spaced therefrom. The blade 28 is connected to the blade 26 by a link 29 so that both contacts 17 and 24 are engaged when the magnet 22 is energized. The plug 7 opposite the graduation B is joined by a conductor 30 to the shunt 23.

A broadcasting instrument 31 is operated from an interrupted circuit embodying a switch arm 32 cooperating with a fixed contact 33. The arm 32 carries an armature 34 adjacent to which is a vibrator core 35 enclosed in a coil 36. One end of the coil is connected by a conductor 37 to a switch arm 38 positioned adjacent to the arm 19 and connected thereto by a link 39. The arm 38 is adapted to engage a fixed contact 40 when the magnet 15 is energized, and the contact 40 is connected by a conductor 41 to one terminal of a current source 42. The other side of the source is joined by a conductor 43 to a movable switch arm 44 carried by the armature 34 and normally closing against a fixed contact 45 which in turn is connected by a conductor 46 to the remaining end of the coil 36. When the coil is energized, on closing of the switch 38, 40 in the operation presently to be described, the armature 34 is attracted to bring the switch arm 32 into engagement with the contact 33 and thereby close the circuit that operates the instrument 31. At the same time, however, the coil circuit is broken by the opening of the switch 44, 45, and as the coil is deenergized a spring 47 returns the switch arm 44 to closed position, again energizing the core and closing the broadcasting circuit. In this manner the broadcast signal is interrupted at a rate determined by the construction of the vibrator mechanism. This construction is such as to produce a pulsating signal with interruptions that are clearly distinguishable by the ear.

As the locomotive gains speed, the pointer 3 moves clockwise. No operation of the signal is desired on this movement. When the pointer engages the first head 10, at graduation A, a complete circuit has not been made because the magnet 22 has not been energized and the switches 17, 28 and 24, 26 remain open. When the head 10 at graduation B has been engaged by the pointer 3, a circuit is closed through the magnet 22 to close the last named switches. Also, a holding circuit for the magnet is made through the shunt 23 and switch 24, 26 to maintain the magnet energized even when the pointer 3 passes graduation B in either direction. However, the vibrator circuit for energizing the broadcasting circuit at the switch 32, 33 has not been energized since the magnet 15 has not been energized to close the switch 38, 40. Thus, no signal is broadcast as the pointer 3 passes graduation B on acceleration. It will be noted however that the magnet 22 remains energized and the switches 17 and 28 and 24, 26 remain closed.

When the locomotive decelerates, the pointer 3 moves counterclockwise. If it reaches graduation A on this movement, a circuit is made through conductor 27, switch 17, 28 and conductor 16 to magnet 15 and conductors 14 and 13. The switches 19, 20 and 38, 40 are thereby closed. The vibrator circuit is thereby completed to broadcast a pulsating signal in the manner already described. A holding circuit for the magnet 15 is made through the conductor 18, the shunt switch 19, 20 and conductor 14, so that the magnet remains closed and the signal continues to operate as the pointer 3 passes the graduation A on deceleration.

Red and green lights 49 and 50 are mounted on the speedometer or elsewhere in view of the engineer. The red light 49 is connected by conductors 51 into the vibrator circuit and will flash at the rate of pulsation of the signal. The green light 50 is connected to a contact bar 52 in the path of contact 11 on the pointer 3 beyond graduation B in the accelerating direction. The green light is connected to the opposite side of the circuit by a conductor 53.

The signal will continue to operate even on acceleration beyond the critical speed represented by graduation A because the magnets 15 and 22 remain energized through their holding circuits. The engineer can de-energize both magnets by opening and then closing a manual switch 54 in one of the main conductors. He will be apprised of the return to safe speed, without observing the pointer 3, when the latter reaches the contact bar 52 and causes illumination of the green light 50. This is his signal to open and close the switch 54 and thereby restore the apparatus to its original condition.

The use of the switch 54 for de-energizing the magnets 15 and 22 in the manner described may be eliminated by the modification illustrated in Figure 2, whereby this operation is rendered automatic for an entire trip. The shunt 23 is eliminated, and another plug 7 is provided in the block 6' for insertion at graduation C next following graduation B in the accelerating direction. From the plug 7, a conductor 60 extends to one terminal of an electromagnet 61, and the other terminal thereof is joined by a conductor 62 into the line 13. A shunt 23' extends from the conductor 30 to the switch contact 24, replacing the shunt 23 of the previous construction. The shunt 23 contains a switch blade 63 across the face of the magnet 61 and normally dropping into engagement with a switch contact 64. The shunt 20a for the contact 20 is replaced by a shunt 20' containing a blade 65 linked at 66 to the blade 63 and normally resting on a fixed contact 67 in the conductor 20'. On acceleration the magnet 22 will be energized, as before, but only until the pointer 3 reaches graduation C. The magnet 61 becomes energized and opens the switches 63, 64 and 65, 67 which in turn open the holding shunts of the magnets 15 and 22. As the switch arm 38 falls to open position, the vibrator circuit is opened and the apparatus is restored to the condition that pertained at the beginning of the cycle already described. In this embodiment of the invention, the manual switch 54 is utilized as a master control switch to be operated only at the beginning and end of a trip.

The magnet 61, in opening the holding circuit for the magnet 22, reduces the length of time that the latter magnet would otherwise be energized. Although the signal will not operate with magnet 22 energized unless magnet 15 is also energized, the magnet 22 will have a longer life if de-energized while the needle 3 moves from graduation C to graduation B.

Although specific embodiments of the invention have been illustrated and described, it will be understood that various alterations in the details of construction may be made without departing from the scope of the invention as indicated by the appended claims.

What I claim is:

1. A speed signalling device comprising an electrically operated signal, a switch controlling the same, a pair of switch contacts representing different speeds, a speed-controlled member adapted to engage said contacts selectively to deliver current thereto, electrical means in the circuit of one of said contacts for closing said control switch, a normally open switch in said circuit, electrical means in the circuit of the other contact for closing the last named switch when said other contact is engaged by said member, whereby said control switch is closed only on movement of said member from said other contact to the first specified contact, automatic holding circuits for both said electrical means, a third switch contact engageable by said member, and electrical means connected to said third said contact for opening said holding circuits.

2. A speed signalling device comprising an electrically operated signal, a switch controlling the same, a pair of switch contacts representing different speeds, a speed-controlled member adapted to engage said contacts selectively to deliver current thereto, an electro-magnet in the circuit of one of said contacts and adapted to close said switch when energized, an electro-magnet in the circuit of the other contact, a normally open switch in the circuit of the first electro-magnet and positioned to be closed by the second electro-magnet when the latter is energized, whereby the control switch remains open until said other contact and the first specified contacts have been successively engaged by said member, automatic holding circuits for both electro-magnets operable on initial energization of said magnets, a third switch contact engageable by said member, and electrical means connected to said third contact for opening said holding circuits.

3. A speed signalling device comprising an electrically operated signal, a switch controlling the same, a pair of switch contacts representing different speeds, a speed-controlled member adapted to engage said contacts selectively to deliver current thereto, an electro-magnet in the circuit of one of said contacts and adapted to close said switch when energized, an electro-magnet in the circuit of the other contact, a normally open switch in the circuit of the first electro-magnet and positioned to be closed by the second electro-magnet when the latter is energized, whereby the control switch remains open until said other contact and the first specified contacts have been successively engaged by said member, automatic holding circuits for both electro-magnets operable on initial energization of said magnets, a third switch contact engageable by said member, normally closed switches in said holding circuits, and a third electro-magnet connected to said third contact and adapted to open the last named switches when energized by said member.

4. A speed signalling device comprising an electrically operated signal, a switch controlling the same, a pair of switch contacts representing different speeds, a speed-controlled member adapted to engage said contacts selectively, electrical means in the circuit of the lower speed contact for closing said switch, a normally open switch in said circuit, electrical means in the circuit of the higher speed contact for closing the last named switch when the last named contact is engaged by said member, whereby said control switch is closed only after the decelerating movement of said member from the higher speed contact to the lower speed contact, automatic holding circuit for both said electrical means, a third switch contact engageable by said member, and electrical means connected to said third contact for opening said holding circuits.

5. A speed signalling device comprising an electrically operated signal, a switch controlling the same, a pair of switch contacts representing a lower speed and a higher speed, a speed-controlled member adapted to engage said contacts selectively to deliver current thereto, an electro-magnet in the circuit of the lower speed contact when energized, and adapted to close said switch when energized, an electro-magnet in the circuit of the higher speed contact, a normally open switch in the circuit of the first electro-magnet and positioned to be closed when the latter is energized, whereby the control switch is closed only after the decelerating movement of said member from the higher speed contact to the lower speed contact, automatic holding circuits for both said electro-magnets, a third switch contact representing a still higher speed and engageable by said member, and electrical means connected to said third contact for opening said holding circuits.

6. A speed signalling device comprising an electrically operated signal, a switch controlling the same, a pair of switch contacts representing a lower speed and a higher speed, a speed-controlled member adapted to engage said contacts selectively to deliver current thereto, an electro-magnet in the circuit of the lower speed contact and adapted to close said switch when energized, an electromagnet in the circuit of the higher speed contact, a normally open switch in the circuit of the first electro-magnet and positioned to be closed when the latter is energized, whereby the control switch is closed only after the decelerating movement of said member from the higher speed contact to the lower speed contact, automatic holding circuits for both said electro-magnets, a third switch contact representing a still higher speed and engageable by said member, normally closed switches in said holding circuits, and a third electro-magnet connected to said third contact and adapted to open the last named switches when energized by said member.

CLARKE L. SHEETS.

REFERENCES CITED

The following references are of record in the file of this patent:

UNITED STATES PATENTS

| Number | Name | Date |
| --- | --- | --- |
| 1,811,800 | Mildenberger | June 23, 1931 |
| 2,294,830 | Brown | Sept. 1, 1942 |
| 2,313,121 | Brown | Mar. 9, 1943 |